(12) United States Patent
Wade et al.

(10) Patent No.: US 10,970,143 B1
(45) Date of Patent: Apr. 6, 2021

(54) EVENT ACTION MANAGEMENT MECHANISM

(71) Applicant: Hewlett Packard Enterprise Development LP, Houston, TX (US)

(72) Inventors: James Eugene Wade, Fort Collins, CO (US); Navaneethan Kanakapura Venugopalan, Fort Collins, CO (US); Rigoberto Corujo, South Amboy, NJ (US); Geoffery Schunicht, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/688,208

(22) Filed: Nov. 19, 2019

(51) Int. Cl.
*G06F 9/54* (2006.01)
*G06F 9/48* (2006.01)

(52) U.S. Cl.
CPC ............ *G06F 9/542* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 7,565,662 B2 | 7/2009 | Martin et al. | |
| 8,930,965 B1 | 1/2015 | Shalev et al. | |
| 9,304,809 B2 | 4/2016 | Lam et al. | |
| 9,542,448 B2 | 1/2017 | Schoning | |
| 2007/0043695 A1* | 2/2007 | Bare | |
| 2008/0126441 A1* | 5/2008 | Giampaolo | |
| 2011/0072442 A1* | 3/2011 | Abdelhadi | |
| 2011/0196964 A1 | 8/2011 | Natarajan et al. | |

OTHER PUBLICATIONS

Google Cloud, "Architecture: Optimizing Large-scale Ingestion of Analytics Events and Logs," Oct. 10, 2018, pp. 1-4 (online), Retrieved from the Internet on Apr. 16, 2019 at URL: <cloud.google.com/solutions/architecture/optimized-large-scale-analytics-ingestion>.
IBM, "Understanding Events," 2019, pp. 1-5 (online), Retrieved from the Internet on Apr. 16, 2019 at URL: <ibm.com/support/knowledgecenter/SSVRGU_10.0.1/user/wpd_controls_events.html>.

* cited by examiner

*Primary Examiner* — Syed A Roni
(74) *Attorney, Agent, or Firm* — Jaffery Watson Mendonsa & Hamilton

(57) ABSTRACT

A system to facilitate event management is described. The system includes a processor and a machine readable medium storing instructions that, when executed, cause the processor to select a first event including first action information indicating a first action to be performed on a first of a plurality of resources, examine the first action information to determine whether the first action matches stored pending action information associated with one or more actions to be performed on the first resource and merge the first action information with the pending action information upon a determination that the first action matches pending action information.

20 Claims, 8 Drawing Sheets

EVENT ACTION MANAGEMENT MECHANISM

BACKGROUND

Computer management systems typically receive events from managed resources in order to determine a response action that needs to be taken. Such event driven systems respond to events as they are received. Each incoming event may have one or more associated actions, which get executed as a result of the event. An action typically performs a specific task, such as updating the database with data from the event, querying the resource to gather additional information, or other actions.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
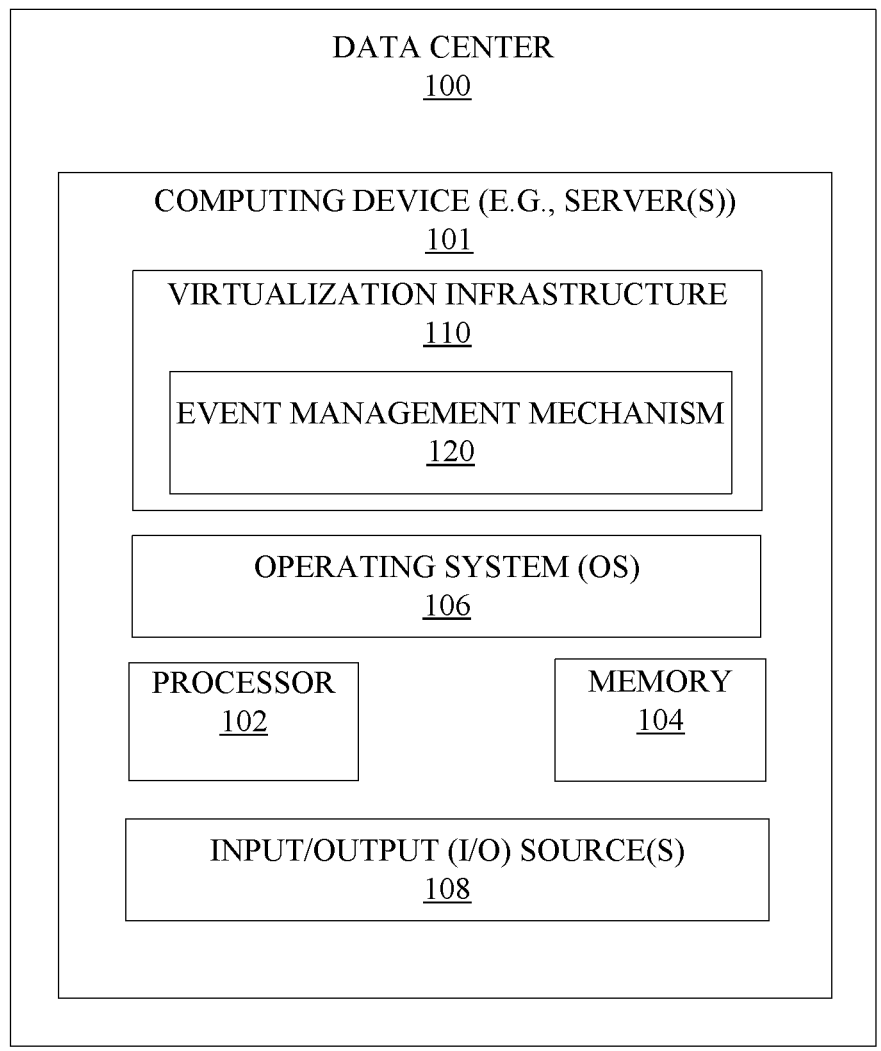
FIG. 1 illustrates one embodiment of a system employing a data center.

An event response system, in order to be responsive, needs to quickly evaluate an incoming event and select one or more resultant actions that are to be taken. Such systems are typically designed to survive a high rate of incoming events in order to efficiently handle the events and ensure all required actions are taken in an acceptable amount of time. However in some instances, the system may become unresponsive if the rate of incoming events overwhelms the system. An unresponsive system may result in required actions being delayed, or not occurring at all, which is unacceptable.

To ensure maximum scalability and performance, efficient handling of events is mandatory. Efficient handling allows the required actions to happen on time without wasting CPU resources on redundant actions. Events may arrive sporadically, or excessively. The management system should require minimal resources when events arrive sporadically. When an overabundance of events arrive, the actions associated with those events need to be processed efficiently, such that the system is not overwhelmed by large numbers of actions triggered by large numbers of events. The event handling mechanism must take into account the priority/urgency/order of occurrence and process actions in an efficient manner. Some actions are urgent, while others can be delayed. Delaying non-urgent actions allows urgent actions to be quickly processed. The non-urgent actions may have different amounts of delay time. Therefore, the order actions are executed may not match the order the triggering events arrived.

In embodiments, a mechanism is provided to facilitate event management by examining incoming events, their associated actions, as well as each action's priority, request frequency and other information about them. Based on the event and action information, actions can be consolidated with similar actions for the same resource, which are pending from earlier events or other triggers. In further embodiments the action information includes priority information to enable execution of the actions to be prioritized.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

FIG. 1 illustrates one embodiment of a data center 100. As shown in FIG. 1, data center 100 includes one or more computing devices 101 that may be server computers serving as a host for data center 100. In embodiments, computing device 101 may include (without limitation) server computers (e.g., cloud server computers, etc.), desktop computers, cluster-based computers, set-top boxes (e.g., Internet-based cable television set-top boxes, etc.), etc. Computing device 101 includes an operating system ("OS") 106 serving as an interface between one or more hardware/physical resources of computing device 101 and one or more client devices, not shown. Computing device 101 further includes processor(s) 102, memory 104, input/output ("I/O") sources 108, such as touchscreens, touch panels, touch pads, virtual or regular keyboards, virtual or regular mice, etc.

In one embodiment, computing device 101 includes a server computer that may be further in communication with one or more databases or storage repositories, which may be located locally or remotely over one or more networks (e.g., cloud network, Internet, proximity network, intranet, Internet of Things ("IoT"), Cloud of Things ("CoT"), etc.). Computing device 101 may be in communication with any number and type of other computing devices via one or more networks.

Figure 2:
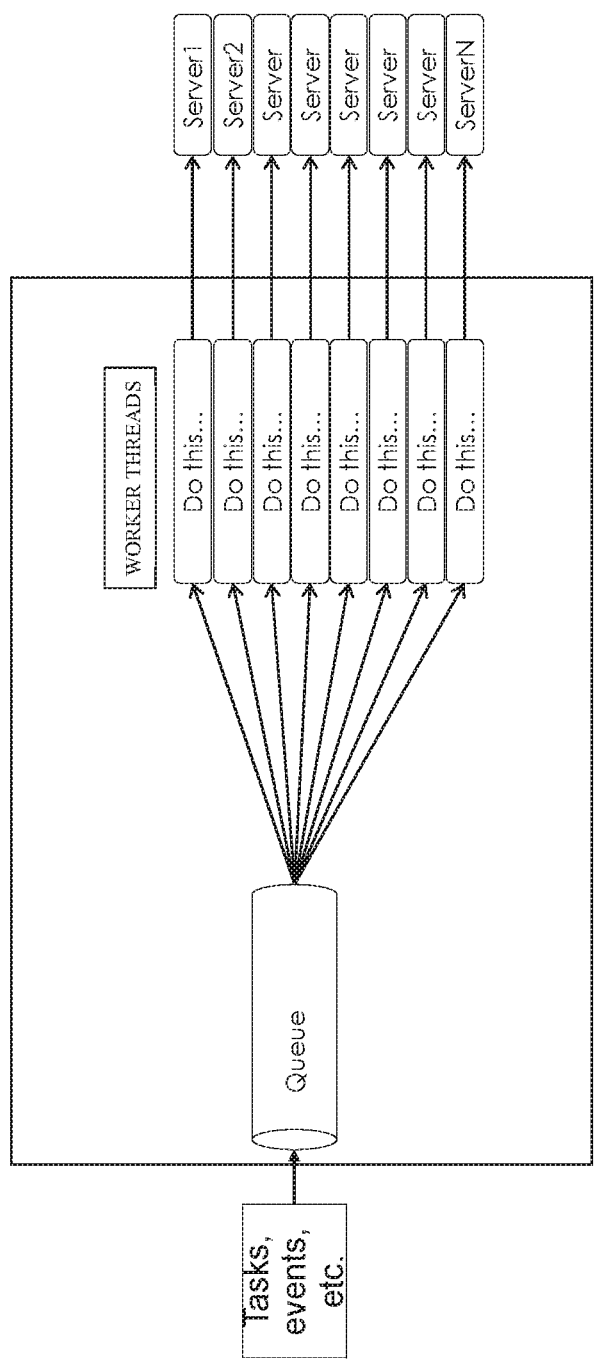
FIG. 2 illustrates a conventional event handling mechanism.

According to one embodiment, computing device 101 implements a virtualization infrastructure 110 to provide virtualization for a plurality of host resources (or virtualization hosts) included within data center 100. In one embodiment, virtualization infrastructure 110 is a software-defined infrastructure that enables compute, networking and storage resources to be flexibly configured on a per-application basis from commoditized hardware. As shown in FIG. 1, virtualization infrastructure 110 includes an event management mechanism 120 to detect events received at virtualization infrastructure 110 and initiate response actions indicated by the events. As discussed above, conventional event handling systems may become overwhelmed by an overabundance of received events. For example, FIG. 2 illustrates a conventional system in which events (or tasks) are received at a queue and are processed by worker threads to perform actions on server resources. However, if the magnitude of received events becomes so large that they cannot be stored in the queue, actions may be delayed or even dropped. Typically, many received events are redundant. For instance, Resource Updated is a common event that is typically triggers some type of rediscover action, where rediscover causes a system to update its internal representation of the resource to match the actual resources state. Since one rediscovery corrects the entire internal representation, additional rediscoveries would not find new data, and thus may be discarded. Thus if a rediscover action is already scheduled for a given resource, there is no need to schedule another for that resource.

According to one embodiment, event management mechanism 120 provides for efficient event handling by consolidating (or merging) redundant actions received in different events that target a common resource. As a result, un-needed/duplicate actions may be discarded to reduce the execution cost of responding to the events. In a further embodiment, event management mechanism 120 performs action prioritization, which moves actions having the highest priority to the front of a queue for execution. In yet a further embodiment, event management mechanism 120 provides a criteria for selecting actions that are ready to be executed, because their preconditions are met, and it is an optimal time for execution of those actions.

Figure 3:
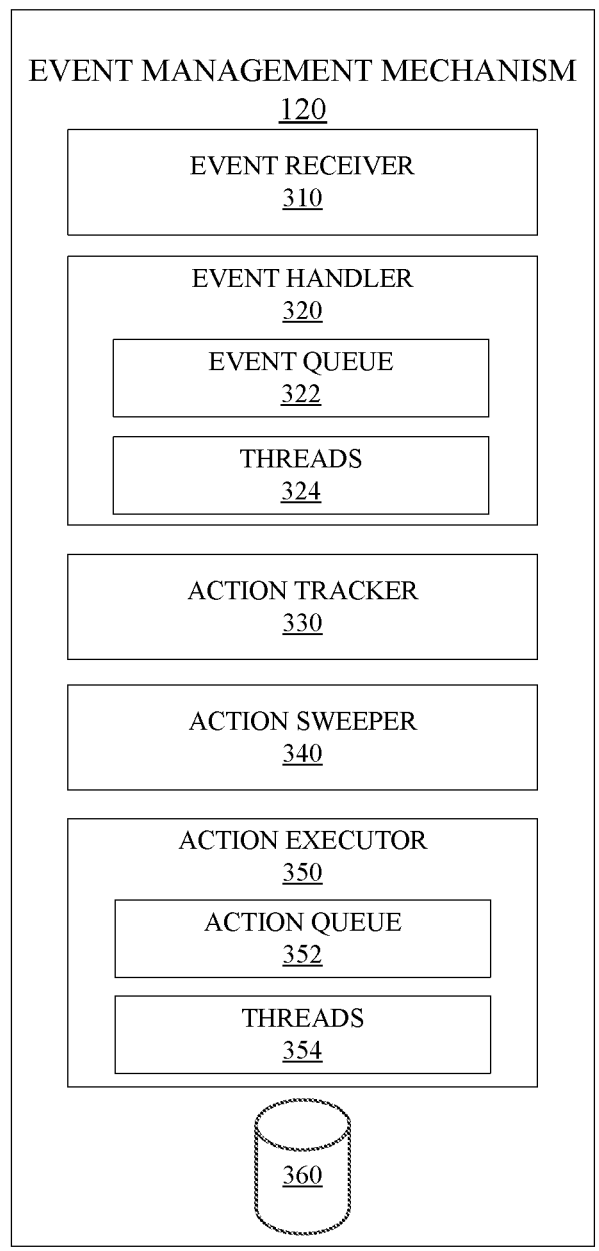
FIG. 3 is a block diagram illustrating one embodiment of an event management mechanism.

FIG. 3 is a block diagram illustrating one embodiment of an event management mechanism 120. As shown in FIG. 3, event management mechanism 120 includes event receiver 310, event handler 320, action tracker 330, action sweeper 340 and action executor 350. Event receiver 310 receives the incoming events and pushes the events to event handler 320. In one embodiment, event receiver 310 may filter (or remove) invalid events (e.g., events associated with resources not being tracked at event management mechanism 120) prior to transmission to event handler 320.

Event handler 320 includes an event queue 322 to receive the events from event receiver 310. In one embodiment, event handler 320 includes threads 324, which pull events from queue 322 and determine one or more actions to be performed on a managed resource in response to the event. In a further embodiment, event handler 320 may perform further validation and reject events. In such an embodiment, event handler 320 may respond to valid events by 1) updating the internal state of virtualization infrastructure 110 with data included in the event; 2) choosing actions virtualization infrastructure 110 is to perform as a result of the event; and/or 3) perform other activities.

According to one embodiment, an event may cause one or more actions, with each action being assigned a priority. Once the internal state is updated, and the resultant actions with priorities are chosen, event handler 320 pushes the selected actions to action tracker 330. However in some embodiments, event handler 320 may push the highest priority actions directly to action executor 350, or even execute those actions inline.

Action tracker 330 receives and stores the actions from event handler 320, along with information associated with the actions (or ActionInfo), in a database 360. In one embodiment, ActionInfo records includes information, such as priority, arrival time, and event information. In a further embodiment, the ActionInfo may be implemented to determine the appropriate time for executing the action. The ActionInfo may further include timestamps for the particular action, the number of requests for the action, as well as any contextual data needed for executing the action. When the action is executed the ActionInfo may be removed from action tracker 330. In yet a further embodiment, action tracker 330 may receive actions not associated with events (e.g., actions needed during normal code execution). According to one embodiment, action tracker 330 stores data on a per managed resource ID basis. Within the data per managed resource, action tracker 330 stores records on a per specific type of Action basis. Additionally, action tracker 330 stores the ActionInfo records for each type of action within each managed resource ID.

Figure 4:
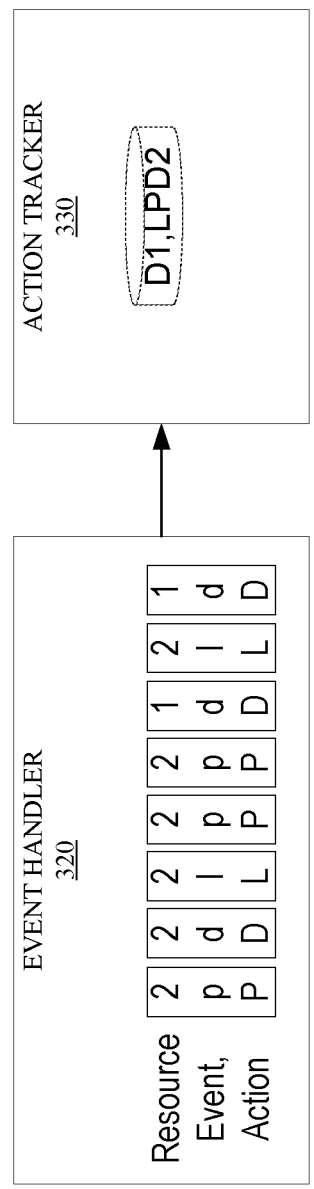
FIG. 4 is a block diagram illustrating one embodiment of a consolidation of event actions.

The ActionInfo enables action tracker 330 to discard un-needed actions, and prioritize order of executing actions. In one embodiment, action tracker 330 groups ActionInfo records on a per managed resource basis. In such an embodiment, there may be zero to many ActionInfo records in action tracker 330 for each managed resource. When a new action arrives for a managed resource that already has a matching ActionInfo, the new data is merged into the existing ActionInfo. FIG. 4 is a block diagram illustrating one embodiment of a consolidation of event actions. As shown in FIG. 4, three D actions at event handler 320 that are targeted for resource 1 are consolidated into a single D action at action tracker 330, while two P actions, two L actions and one D targeted for resource 2 are consolidated into single L, P and D actions Referring back to FIG. 3, action sweeper 340 selects and transfers actions from action tracker 330 into an action queue 352 within action executor 350. In one embodiment, action sweeper 340 operates at predetermined intervals to query action tracker 330 with criteria. In such an embodiment, action tracker 330 returns all actions that match the criteria to action sweeper 340. Criteria represents a decision function that is executed against ActionInfo. The criteria may view any data in the ActionInfo to determine whether an action should be executed at the current time. An example criteria could include: (FirstRequestForThisAction >10 seconds ago && MostRecentRequestForThisAction>1 second ago && ActionPriority HIGH).

Criteria are passed from action sweeper 340 to action tracker 330 to determine which actions should be executed. Thus, using criteria allows action sweeper 340 to use different criterial based on the system state. In one embodiment, the criteria specifies a delay time, with longer delays allowing more time for duplicate requests to arrive and be discarded. Low priority or long running tasks might have a longer time, while high priority tasks could have the time specified as zero. A delay of 0 causes the action to be collected on a first action sweeper 340 run where other criteria are met.

In one embodiment, ActionInfo matching the criteria will be removed from action tracker 330, while ActionInfo that does not match the criteria remain in action tracker 330. Once removed, an arrival of a new event action creates a new ActionInfo entry in action tracker 330 having newly updated timing and other data that restarts the wait. This process may occur even while an action is being executed in the action executor 350 for the first action."

In a further embodiment, action sweeper 340 groups and pushes the actions into action queue 352 after ActionInfo has been removed. The actions pushed into action queue 352 are grouped based on whether actions should be executed sequentially. However in other embodiments, action queue 352 may be grouped based on other reasons (e.g., actions should not be executed simultaneously). If operating under high load, or if action executor 350 is not keeping up with the load, action sweeper 340 reduces the actions transferred to action executor 350. Reducing the transferred actions provides time for action executor 350 to catch up, and actions to remain in the action tracker 330 longer, thus allowing more consolidating and discarding.

Figure 5:
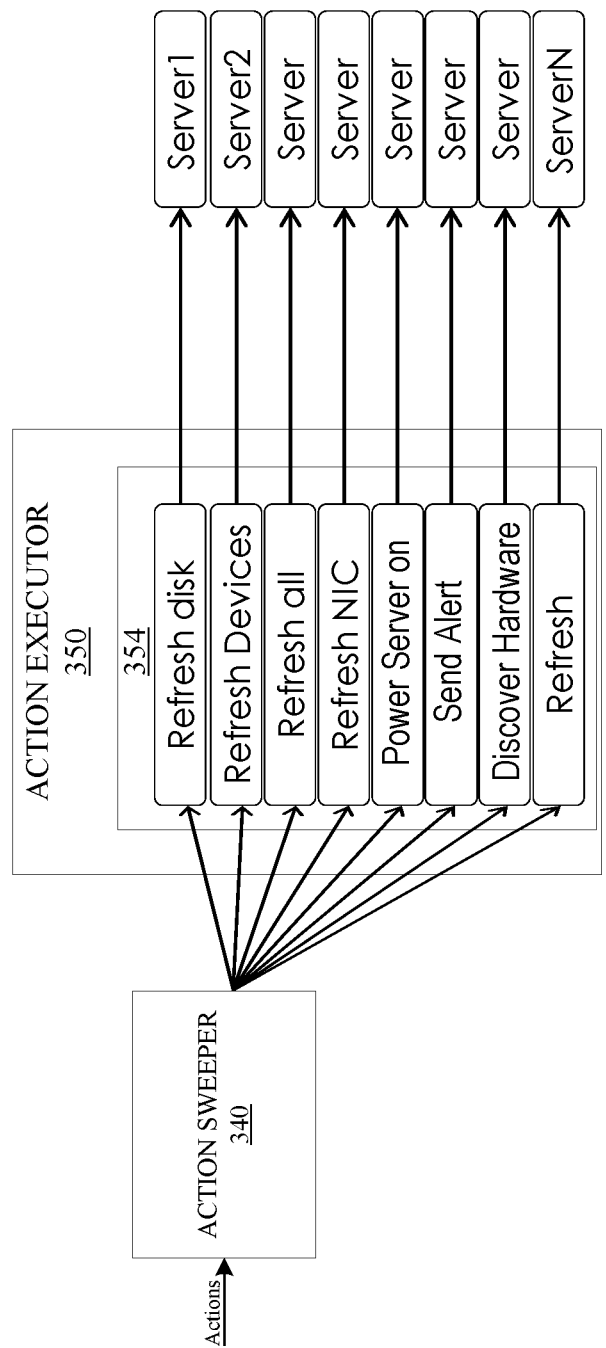
FIG. 5 is a block diagram illustrating another embodiment of event management mechanism.

Action executor 350 includes threads 354 to execute the actions (e.g., work represented by an action) stored in action queue 352. According to one embodiment, each slot in queue 352 holds an ordered collection of actions, with action executor 350 iterating through the queue 352. In one embodiment, actions are ordered within each slot to allow sequential execution. A thread processing a slot may execute the contained actions in order. Thus, for each queue 352 slot, threads 354 execute all included actions in order. FIG. 5 is a block diagram illustrating one embodiment of action executor 350 in which action sweeper 340 stores actions within action executor queue 352 that are executed by threads 354 to perform an action for a resource. For instance, a refresh disk action is executed for a Server1, a Refresh Device action is performed on a Server2, etc.

Figure 6A:
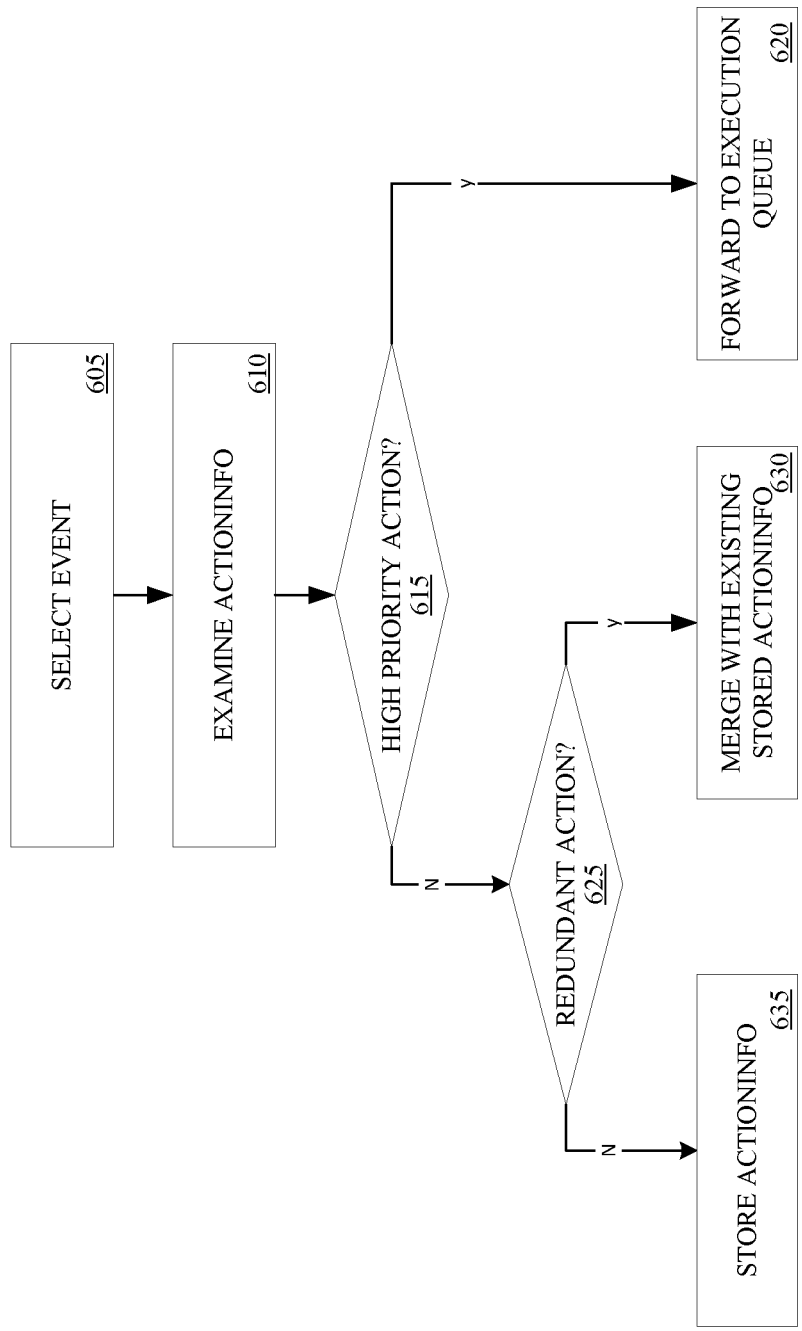
FIGS. 6A&6B are flow diagrams illustrating embodiments of processes implemented by an event management mechanism.
Figure 6B:
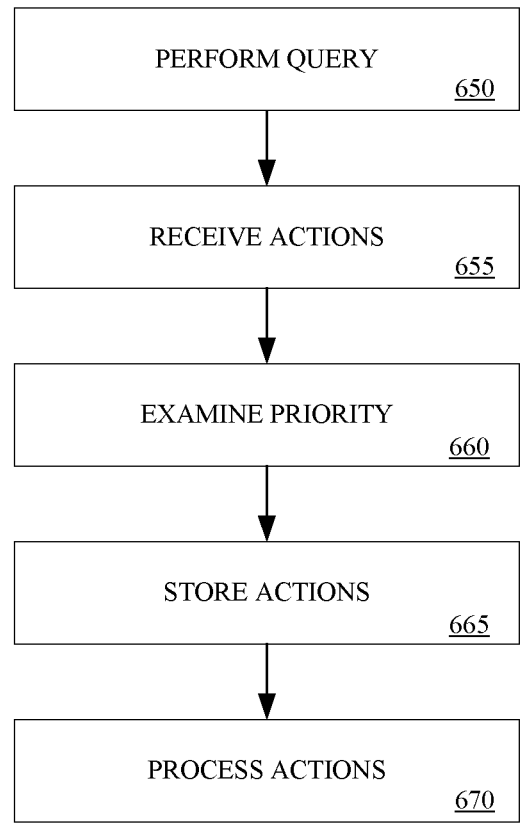

FIGS. 6A & 6B are flow diagrams illustrating embodiments of processes implemented by event management mechanism 120. FIG. 6A is a one embodiment of a method for processing an action at event management mechanism 120. At processing block 605, a received event is selected (e.g., from event queue 322). At processing block 610, the ActionInfo for the event is examined. In one embodiment, examining the ActionInfo includes an examination of the priority information included in the ActionInfo to determine a priority of the action to be performed. At decision block 615, a determination is made as to whether the ActionInfo indicates that the action associated with the event has a high priority. If so, the action is forwarded to the execution queue (e.g., action queue 352) for execution, at processing block 620.

However, upon a determination that the action is not of high priority, a determination is made as to whether the ActionInfo indicates that the action is redundant (e.g., matches ActionInfo for a managed resource already being processed), decision block 625. At processing block 630, the ActionInfo is merged with previously stored pending ActionInfo for one or more existing actions upon a determination that ActionInfo indicates that the event is redundant. Otherwise, the ActionInfo for the current action is stored (e.g., at database 360) individually, at processing block 635.

FIG. 6B is a flow diagram illustrating one embodiment of a method for executing the stored actions at event management mechanism 120. At processing block 650, a query of the stored ActionInfo is performed using one or more criteria indicating actions that are to be executed. At processing block 655, actions matching the criteria are received. At processing block 660, the priority information included in the action information of the received actions is examined to determine the relative priority of the actions. At processing block 665, the actions are stored in the execution queue (e.g., action queue 352) in an order based on priority (e.g., highest to lowest priority). At processing block 670, the actions are executed by processing threads (e.g., threads 354) to perform work represented on managed resources indicated by the actions.

The above-described event management mechanism reduces work needed for responding to events by consolidating actions, thus avoiding extra work of repeating the same actions. Accordingly, more events may be processed in the same amount of time. Additionally, the mechanism prioritizes actions so that higher priority actions are executed first.

Figure 7:
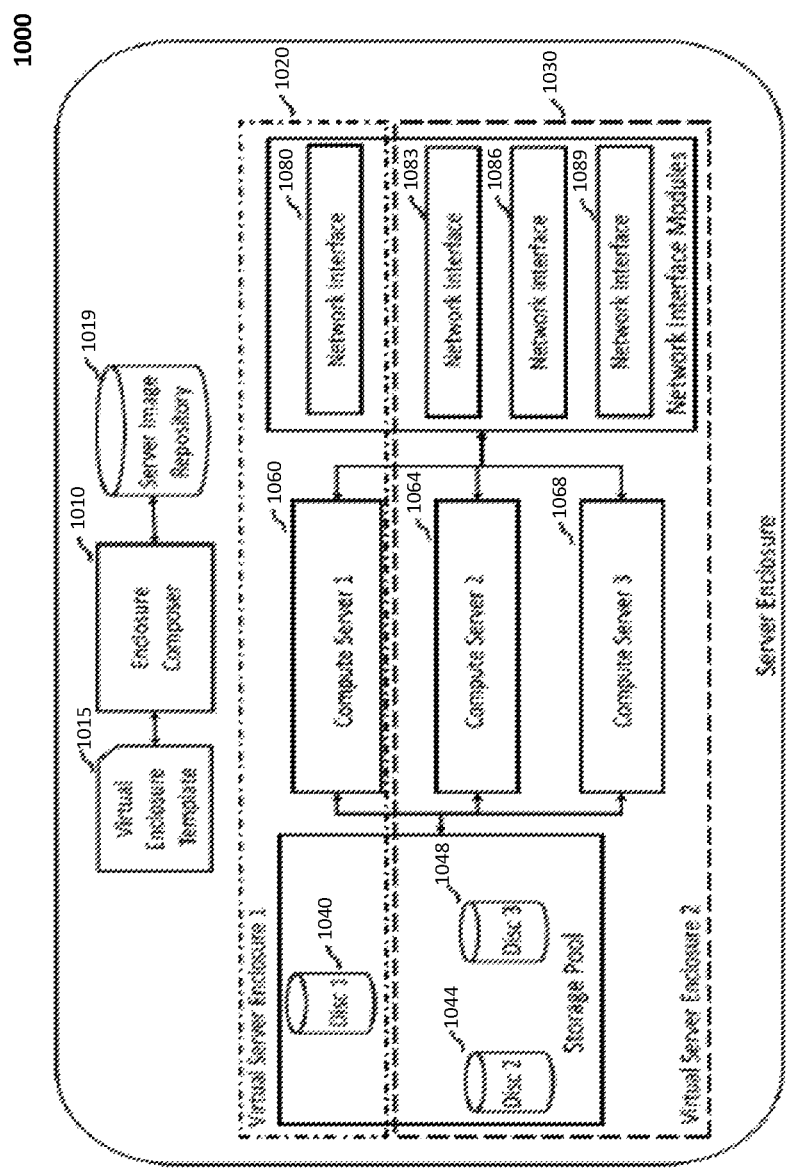
FIG. 7 is a block diagram illustrating one embodiment of a multi-tenant server enclosure.

FIG. 7 is a block diagram illustrating one embodiment of a multi-tenant server enclosure 1000 to implement a virtualization infrastructure 110 having an event management mechanism 120. The multi-tenant server enclosure 1000 includes a plurality of resources such as a plurality of compute servers (1060, 1064, 1068), storage modules (1040, 1044, 1048) and network interfaces (1080, 1083, 1086, 1089). A plurality of workloads belonging to various tenants may be deployed on the resources of the multi-tenant server enclosure 1000. As generally described herein, compute servers include any number of processing resources (e.g., central processing units, graphics processing units, microcontrollers, application-specific integrated circuits, programmable gate arrays, and/or other processing resources). Similarly, storage modules include any storage resources (e.g., random access memory, non-volatile memory, solid state drives, hard disk drives HDDs, optical storage devices, tape drives, and/or other suitable storage resources). Further, network interfaces include any network resources (e.g., Ethernet, IEEE 802.11 Wi-Fi, and/or other suitable wired or wireless network resources, I/O resources, and/or other suitable computing hardware). Each resource may have metadata associated with it, which may be in the form of labels or annotations specifying different attributes (e.g., application configuration attributes) related to the resource. Each resource capable of being connected to every other resource in the enclosure 1000 and is capable transferring data to every other resource in the enclosure 1000.

The multi-tenant server enclosure 1000 may be segmented into one or more virtual enclosures (1020, 1030) on which the workloads are deployed. Each virtual enclosure is dedicated to a tenant. The multi-tenant server enclosure 1000 further includes an enclosure composer 1010 (also referred to as enclosure controller 1010). The enclosure composer 1010 is responsible for creating, configuring and managing virtual enclosures (1020, 1030) of the multi-tenant server enclosure 1000. The enclosure composer 1010 is connected to a server image repository 1019. The server image repository 1019 comprises a plurality of server images which may be deployed on the virtual enclosures by the enclosure composer 1010. Moreover, multi-tenant server enclosure 1000 includes a virtual enclosure template 1015 which is used for provisioning the virtual enclosures (1020, 1030). The virtual enclosure template 1015 contains parameters for configuration and creation of the virtual enclosure.

Each virtual enclosure is a logical entity comprising one or more compute servers, one or more storage modules and one or more network interfaces. The resources allocated to the virtual enclosure are dedicated to the virtual enclosure and the corresponding tenant. This allows for physical isolation amongst the tenants and therefore provides improved security and manageability. Additionally, each virtual enclosure is created automatically by the enclosure composer 1010 using the virtual enclosure template 1015. It is to be noted that while one virtual enclosure template 1015 is shown in FIG. 7, there can be plurality virtual templates for creating virtual enclosures of varying configurations.

According to one embodiment, enclosure 1000 is a blade server enclosure having a plurality of blade servers. In such an embodiment, each blade server may include a management controller. In a further embodiment, one or more of the management controller at a blade server may managed via enclosure composer 1010 to provide one or more virtual enclosures.

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A system to facilitate event management, comprising:
a processor; and
a non-transitory machine-readable medium storing instructions that, when executed, cause the processor to:
select a first event including first action information indicating a first action to be performed, one of a plurality of resources on which the first action is to be performed and contextual data to execute the first action;
examine the first action information to determine whether the first action matches stored pending action information associated with one or more actions to be performed on a first of the plurality of resources; and
merge the first action information with the pending action information upon a determination that the first action matches pending action information.

2. The system of claim 1, wherein the processor stores the first action information individually upon a determination that the first action does not match pending action information.

3. The system of claim 1, wherein the processor examining the first action information further comprises examining first priority information included in the action information to determine a priority of the first action.

4. The system of claim 3, wherein the processor forwards the first action to an execution queue upon a determination that first priority information indicates a high priority.

5. The system of claim 1, wherein the processor further performs a query of stored action information based on one or more criteria indicating actions that are to be executed.

6. The system of claim 5, wherein the processor further receives one or more actions having action information that matches the one or more criteria.

7. The system of claim 6, wherein the processor further examines the action information to determine a priority of the one or more actions.

8. The system of claim 7, wherein the processor further stores the one or more actions in an execution queue in an order based on the priority.

9. The system of claim 8, wherein the processor executes the one or more actions via a plurality of processing threads.

10. A method to facilitate event management, comprising:
selecting a first event including first action information indicating a first action to be performed, one of a plurality of resources on which the first action is to be performed and contextual data to execute the first action;
examining the first action information to determine whether the first action matches stored pending action information associated with one or more actions to be performed on a first of the plurality of resources; and
merging the first action information with the pending action information upon a determination that the first action matches pending action information.

11. The method of claim 10, further comprising storing the first action information individually upon a determination that the first action does not match pending action information.

12. The method of claim 11, wherein examining the first action information further comprises:
examining first priority information to determine a priority of the first action; and
forwarding the first action to an execution queue upon a determination that first priority information indicates a high priority.

13. The method of claim 10, further comprising:
performing a query of stored action information based on one or more criteria indicating actions that are to be executed; and
receiving one or more actions having action information that matches the one or more criteria.

14. The method of claim 13, further comprising:
examining the action information to determine a priority of the one or more actions; and
storing the one or more actions in an execution queue in an order based on the priority.

15. The method of claim 14, further comprising executing the one or more actions via a plurality of processing threads.

16. A non-transitory machine-readable medium storing instructions which, when executed by a processor, cause the processor to:
select a first event including first action information indicating a first action to be performed, one of a plurality of resources on which the first action is to be performed and contextual data to execute the first action;
examine the first action information to determine whether the first action matches stored pending action information associated with one or more actions to be performed on a first of the plurality of resources; and
merge the first action information with the pending action information upon a determination that the first action matches pending action information.

17. The non-transitory machine-readable medium of claim 16, storing instructions which, when executed by the processor, further cause the processor to store the first action information individually upon a determination that the first action does not match pending action information.

18. The non-transitory machine-readable medium of claim 17, storing instructions which, when executed by the processor, further cause the processor to examine first priority information to determine a priority of the first action; and
forward the first action to an execution queue upon a determination that first priority information indicates a high priority.

19. The non-transitory machine-readable medium of claim 16, storing instructions which, when executed by the processor, further cause the processor to:
perform a query of stored action information based on one or more criteria indicating actions that are to be executed; and
receive one or more actions having action information that matches the one or more criteria.

20. The non-transitory machine-readable medium of claim 19, storing instructions which, when executed by the processor, further cause the processor to:
examine the action information to determine a priority of the one or more actions;
store the one or more actions in an execution queue in an order based on the priority; and
execute the one or more actions via a plurality of processing threads.

* * * * *